June 24, 1958 R. J. D. REEVES 2,840,756
OSCILLOSCOPES
Filed Oct. 26, 1955 2 Sheets-Sheet 1
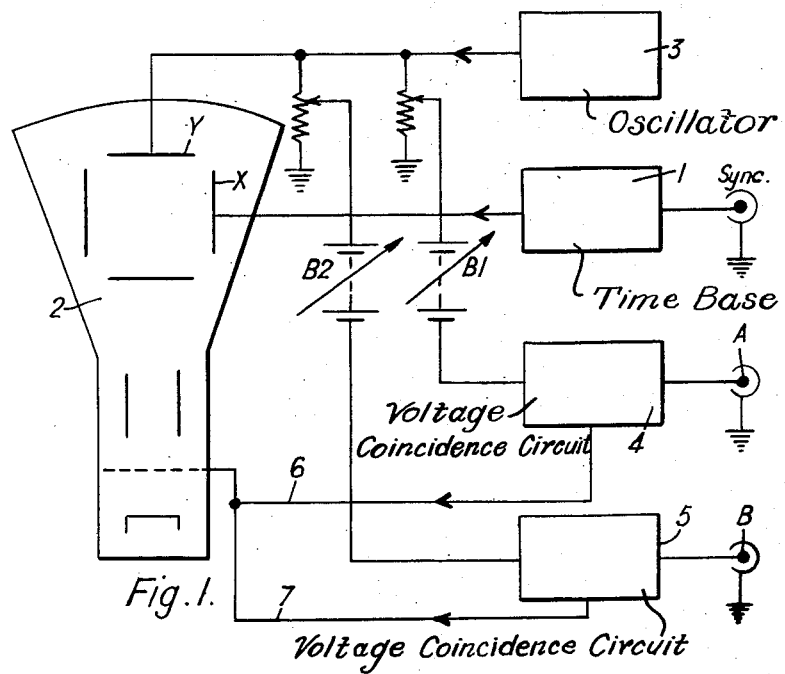
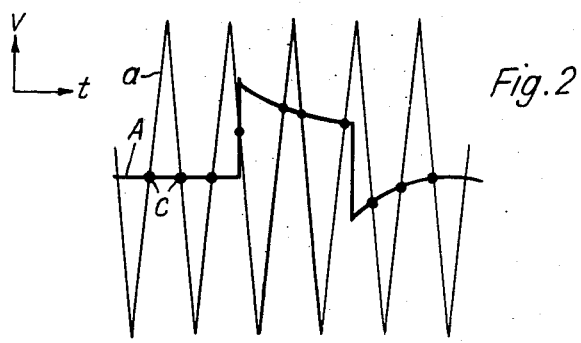
Inventor
RAYMOND J. D. REEVES
By
Mead, Browne, Schuyler & Beveridge
Attorneys June 24, 1958 R. J. D. REEVES 2,840,756
OSCILLOSCOPES
Filed Oct. 26, 1955 2 Sheets-Sheet 2
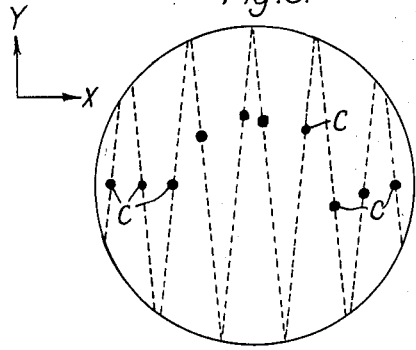
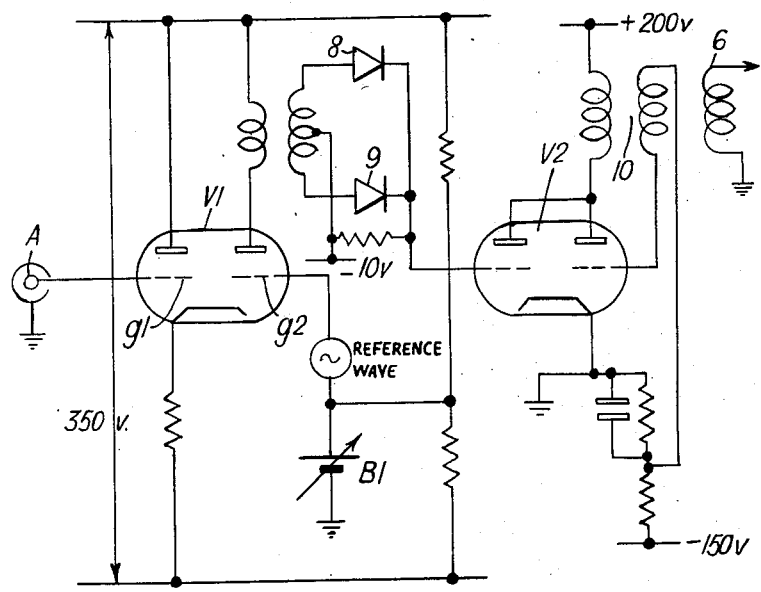
Inventor
RAYMOND J. D. REEVES

2,840,756
OSCILLOSCOPES

Raymond J. D. Reeves, Chippenham, England, assignor to E. K. Cole Limited, Southend-on-Sea, England Application October 26, 1955, Serial No. 542,997

Claims priority, application Great Britain October 30, 1954

5 Claims. (Cl. 315—22)

The general problem of oscillography is to produce on the screen of a cathode ray tube a representation of any repetitive function which is available as a voltage waveform, and to provide facilities for time and amplitude measurements of that waveform. Since the electron beam in the tube is deflected by voltage it is customary to apply the function directly to the deflector plates, generally through the medium of a voltage amplifier. Although the limitations associated with this technique can hardly be described as severe some difficulties are encountered when extremely high or extremely low frequencies are required to be amplified, or when the function has a comparatively high D. C. content which is required to be measured, and substantial "shift" is necessary to bring the waveform variations to the linear part of the transfer characteristic.

Now it will be appreciated that an event occupying a finite space on the screen represents a function which is being continuously repeated in the time domain, this point being tacitly understood by the observer, who is not directly aware of the periodic nature of the display. But in a conventional oscillograph, the luminous image itself is being retraced at the same rate and frequency (or a principal sub-harmonic), not because it is important to do so but simply because it is expedient. Discounting the possibility of high mobile displays it may be said that the information content of the waveform is exhausted after the first sweep, and thereafter the problem is one of recording the display. Yet the amplifier is capable of transferring new information in every sweep, which is usually a rate far higher than can be assimilated anyway, and therefore it may be asserted that, fundamentally, it is of unnecessarily high quality for its ultimate purpose. It is really only necessary to retrace the display sufficiently often to avoid flicker and sufficiently often to indicate a change in the waveform without undue delay. It is not important to trace at the speed of occurrence of the event and it is not even necessary to trace in the direction on the tube face which represents time advancing. This discrepancy between the speed of the event and the necessary speed of image synthesis has already been exploited in stroboscopic oscillographs for the purpose of extending the high frequency limit of their working range. In such instruments frequencies as high as 300 mc./s. are represented by an image which is traced at quite a low rate.

A feature of the present invention is an apparatus and method of synthesising input waveform shapes on the screen of a cathode ray tube, in which the X deflection is a conventional time base and the Y deflection is any convenient waveform, co-phased copies of this waveform of variable magnitude and variable voltage origin being compared with respective input waveforms by voltage coincidence circuits which supply brightening pulses to the cathode ray tube whenever an input and its reference waveform pass through voltage coincidence.

The above and other features of the invention will be more readily understood by a perusal of the following description having reference to the accompanying drawings in which Figure 1 is a schematic circuit diagram of one form of the invention, Figure 2 shows curves referred to in explaining the operation of the apparatus of Figure 1 and Figure 3 illustrates a typical result obtained in the cathode ray tube of said apparatus. Figure 4 is a circuit diagram of a part shown in block schematic in Figure 1 and introduces a convenient modification.

In Figure 1 a time base 1 may be of conventional form and provides the X deflection on a cathode ray tube 2. A sinusoidal audio frequency oscillator 3 is allowed to run independently of the trigger or input waveforms so that its frequency is not correlated with that of the function to be presented in the tube 2. The oscillator 3 provides a number of co-phased outputs, one of which is connected to the Y plates of the tube and is adapted to deflect it fully. The other of said outputs are reference signals which by $B_1$ and $B_2$ can be individually adjusted in magnitude and shifted in origin so that they explore a suitable part of the voltage scale. The waveforms to be examined are introduced at A and B respectively. Between the waveforms to be examined and each of these reference signals are interposed voltage coincidence circuits 4 and 5. Each voltage coincidence circuit provides over leads 6 and 7 a bright-up pulse for the tube whenever its respective waveform i. e. A or B and the reference waveform are at the same potential. In this way the time of the voltage coincidence is recorded as a dot on the sinusoidal trace, and an aggregate of such dots suggests the shape of the input function. On the faster time base speeds the number of coincidences obtained per scan may be few (see Figure 2) but the point is that they can be accumulated over many scans, particularly if a long persistence screen is used, for the dots do not in general fall in the same place on successive scans if the A. F. oscillator is running free. In fact, the time taken to synthesise the picture, i. e. accumulate sufficient dots, does not progressively shorten as the time base speed increases, but remains at a certain minimum value which is a function of the oscillator frequency and the screen afterglow time.

In Figure 2 a typical reference wave $a$ is plotted with time as abscissae and voltage as ordinates. The wave form under observation e. g. from A in Figure 1 is represented by A in Figure 2. The points $c$ are points of coincidence of $a$ and A. These points are "bright-up" pulses in the cathode ray tube and give a presentation shown in Figure 3.

Other input waveforms can be compared with different reference signals and be presented at the same time, giving the effect of a multiple split beam. Each waveform can be individually shifted and magnified so that functions that are widely separated on the voltage scale may be brought into juxtaposition on the screen. If a common reference signal is used with all input waveforms the voltage aperture that the screen represents is guaranteed to be uniform, and signal magnitudes may be compared, or voltage cursor lines may be superposed on one function. Furthermore a monitored cursor line may be shifted across the function to measure it when the reference voltage is common to both.

The coincidence circuits need to be of high input impedance and two valves with their cathodes connected together and connected through a high resistance to a negative potential to constitute what is usually termed a long tailed pair circuit is suitable at the front end. It is only practicable to record transient coincidence but this is not a limitation since prolonged equality of the input function and the reference signal is again contrary to the hypothesis of uncorrelated frequencies.

In Figure 4 is shown a simple voltage coincidence circuit shown in block schematic at 4 Figure 1. A similar circuit would be used for 5 Figure 1. In Figure 4 waveform A is introduced on a grid $g1$ of a double triode valve $V_1$ and the reference wave is introduced to grid $g2$ of the valve. $B_1$ is the source of shift volts mentioned with reference to Figure 1. The output from $V_1$ is passed through a peaking transformer to rectifiers 8 and 9 to a grid of a blocking oscillator $V_2$ whose output is fed from a transformer 10 to a lead 6 connected to the beam control eletcrode of the cathode ray tube.

The amplitude of the reference signal defines the apparent screen aperture and therefore corresponds to the normal sensitivity control, and the maximum sensitivity is limited by the resolution of the voltage coincidence circuit. The available shift is of course quite unrelated to the sensitivity and a vertical expansion effect is achieved. For this feature the power supply for the input stage of the coincidence circuit should preferably be carried on the shift volts, in order to reduce the necessary signal handling capacity of that stage.

Because the Y deflection waveform is so elementary it is preferable to drive the stiffest tube co-ordinate with this signal and use the more sensitive plates for the time base deflection. In this way the time base indirectly benefits from this type of presentation.

The factor which limits the permissible speed of the time base is the duration of the bright-up pulse, for this is intended to mark a point and should therefore occupy, say, less than one five hundredth part of the sweep duration. A 100 $\mu$secs. sweep therefore demands .2 $\mu$sec. pulses and represents about the ultimate limit of time base speed. In other words the method is not suited for fast displays.

Another point is that the trace is plainly discontinuous in appearance with the collection of discrete points much in evidence. The effect is of a travelling chain of dots, constrained to follow the shape of the input function, but unfortunately the chain never appears to have sufficient velocity to create the impression of complete continuity. A more serious consequence of the dot structure is that false patterns can be suggested when the time base is incorrectly synchronised to the waveform. The multiple valued patterns produced on a conventional oscillograph when the time base frequency has a fractional relation to that of the input waveform is a familiar occurrence. Under similar conditions however the coincidence oscilloscope will often produce a pattern which suggests a single valued function of completely erroneous shape. Such false patterns however can be shifted or destroyed by slightly changing the oscillator frequency, and therefore doing this constitutes a test for the validity of the display.

The problems encountered in the design of this kind of instrument are quite different from the familiar ones of amplification, and are largely concerned with the method of indicating voltage coincidence. There is no particular difficulty about this but it is desirable to maintain simplicity in this part of the circuit because the input stage at least has to be duplicated for each separate input channel. A fixed time lag in registering the coincidence is no drawback because it is easily corrected by advancing the phase of the sine wave which sweeps the tube, relative to the reference signals.

The image on the screen does not suffer from any distortion in the usual sense although the unwanted dot structure may become objectionable or inadequate in cases where the duty cycle of the time base is very low or the frequency of the A. F. oscillator has an unfortunate relationship to that of the time base. The last condition can be cured of course by having an adjustment control for the oscillator frequency. The fact that the Y deflection signal is in D. C. isolation from all inputs ensures that there is no difficulty with astigmatism, and this coupled with the fact that the brightness of the trace is independent of the input waveform means that the brightness and focus controls are certainly only occasionally required, and may perhaps be preset.

Since the D. C. level of the signal is preserved in the display, and large shift voltages can be applied, the facilities for voltage measurement are very good, and the system comes into its own as a general purpose measuring instrument.

What I claim is:

1. In an oscilloscope, a cathode ray tube, a time base circuit providing deflection means in one direction of the cathode ray beam, means for deflecting the beam at right angles to said first direction said latter means being operated by any convenient waveform, means whereby co-phased copies of this waveform are compared with an input waveform to be observed, said means including voltage coincidence circuits which supply a brightening pulse to the cathode ray tube whenever an input waveform and its reference waveform pass through voltage coincidence.

2. In an oscilloscope, a cathode ray tube, an audio frequency oscillator coupled across beam deflecting means of the cathode ray tube to give deflection in one direction, a normal time base circuit deflecting the beam in a direction at right angles to said first direction, means for deriving from the oscillator a reference wave, an input terminal for a waveform to be observed, a voltage coincidence circuit to which said reference wave and waveform are applied, means in said circuit for producing a voltage pulse whenever a voltage coincidence occurs between said waves and means for impressing the voltage pulse on a beam intensifying electrode in the cathode ray tube.

3. In an oscilloscope a cathode ray tube, an audio frequency oscillator coupled across beam deflecting means of the tube to give deflection in one direction, a normal time base circuit deflecting the beam in a direction at right angles to said first direction, means for deriving from the oscillator a plurality of co-phased reference waves, a corresponding number of input terminals for wave forms to be observed, voltage coincidence circuits one individual to each reference wave and a different one of each of said waveforms, means for coupling the output of said voltage coincidence circuits jointly to a beam intensifying electrode in the cathode ray tube.

4. In an oscilloscope, a cathode ray tube, an audio frequency oscillator coupled across beam deflecting means of the cathode ray tube to give deflection in one direction, a normal time base circuit deflecting the beam in a direction at right angles to said first direction, means for deriving from the oscillator a reference wave, an input terminal for a waveform to be observed, a voltage coincidence circuit to which said reference wave and waveform are applied, means in said circuit for producing a voltage pulse whenever a voltage coincidence occurs between said waves, a blocking oscillator coupled to an input electrode of the cathode ray tube and means coupling the output of said voltage coincidence circuit in triggering relationship with said blocking oscillator.

5. In an oscilloscope a cathode ray tube, an audio frequency oscillator coupled across beam deflecting means of the tube to give deflection in one direction, a normal time base circuit deflecting the beam in a direction at right angles to said first direction, means for deriving from the oscillator a plurality of co-phased reference waves, a corresponding number of input terminals for waveforms to be observed, voltage coincidence circuits one individual to each reference wave and a different one of each of said waveforms, a blocking oscillator coupled to an input electrode of the cathode ray tube and means coupling the output of said voltage coincidence circuit jointly in triggering relationship with said blocking oscillator.

References Cited in the file of this patent

UNITED STATES PATENTS

| | | |
|---|---|---|
| 2,547,289 | Smart | Apr. 3, 1951 |
| 2,576,859 | Schroeder | Nov. 27, 1951 |
| 2,671,182 | Havens et al. | Mar. 2, 1954 |